(12) United States Patent
Miller

(10) Patent No.: US 8,404,065 B2
(45) Date of Patent: Mar. 26, 2013

(54) METHOD AND APPARATUS FOR INSTALLING A SURFACE CONFORMING DRYWALL ANCHOR

(76) Inventor: Robert W. Miller, Huntington Beach, CA (US)

( * ) Notice: Subject to any disclaimer, the term of this patent is extended or adjusted under 35 U.S.C. 154(b) by 1 day.

(21) Appl. No.: 13/135,160

(22) Filed: Jun. 28, 2011

(65) Prior Publication Data
US 2013/0000818 A1    Jan. 3, 2013

(51) Int. Cl.
*E04F 13/07* (2006.01)
*F16B 39/02* (2006.01)

(52) U.S. Cl. ............... 156/71; 156/92; 411/82; 411/258

(58) Field of Classification Search ............... 156/71, 156/91, 92; 411/81, 82, 180, 258, 930
See application file for complete search history.

(56) References Cited

U.S. PATENT DOCUMENTS
2009/0108155 A1*  4/2009  Benitez ............... 248/217.4

FOREIGN PATENT DOCUMENTS
JP         2005023550 A  *  1/2005

OTHER PUBLICATIONS
English Abstract of JP 2005-23550.*
Machine English Translation of JP 2005-23550.*

* cited by examiner

*Primary Examiner* — Sing P Chan
(74) *Attorney, Agent, or Firm* — Leonard Tachner

(57) ABSTRACT

A wall anchor insert, and an installation tool and method to allow for the installation of a wall anchor flush to wall surface. The materials are a polymeric insert, and a moisturing curing adhesive resin. The installation tool facilitates the installation of anchor, including the required resin coating, and insures that anchor is flush. At such time that redecorating is done, there will be no unsightly anchor to remove or wall damage to repair. The anchor is left in place with only one small screw hole to spackle.

5 Claims, 3 Drawing Sheets

METHOD AND APPARATUS FOR INSTALLING A SURFACE CONFORMING DRYWALL ANCHOR

BACKGROUND OF THE INVENTION

1. Field of the Invention

The present invention relates to wall anchors, and more particularly to a method and an apparatus useful therewith for installing a wall mounted anchor flush with the adjacent wall surface.

2. Description of the Prior Art

Decorating one's home or place of business is an activity practiced with frequent repetition as we each mature and progress. One consequence of such progression is the residue and clutter of all sorts of wall scarring left by the previous abandoned fastener anchors, which once served well, but now are no longer needed.

One constant burden associated with all our re-decorating efforts is the repeated repair and refinishing of the walls, so that the old scars do not detract from our present effort.

One item that compounds the wall scarring problem are the current anchor structures that are used to provide the robust interface between the fastener suspending a decorative item and the wall on which it hangs. Since the suspending location rarely coincides with the location of wall framing, this anchor usually takes the form of an insert threaded on its exterior which is screwed into a hole made in the wall until an exterior flange thereon bottoms out against the wall surface, thus expanding the local load bearing area and therefore the local bearing capacity of the wall.

Once this insert is fixed in the wall, a screw fastener is then driven into its interior, deforming and/or separating the buried portions thereof to fully engage the wall structure, and examples of such wall mounting anchors can be found in the teachings of U.S. Pat. Nos. 5,190,425 to Wieder et al.; 5,791,845 to Fulop; 7,261,505 to Ernst et al; US published application 2010/0219307 by Ernst et al.; and many others.

While suitable for the purposes intended, each of the foregoing anchor structures, and similar others, protrude beyond the wall surface in which they are mounted, and therefore need to be removed from their fully imbedded capture, causing substantial wall damage that then needs extensive repair. A wall anchor material and process that would result in flush to wall installation and thereby eliminate or reduce the need for wall refinishing is desired. It is one such combination that is described herein.

SUMMARY OF THE INVENTION

Accordingly, it is the general purpose and object of the present invention to provide an anchor insert, an installation tool therefore, and a process for the use thereof that assure a wall mounting that is flush with the wall surface.

Further and additional objects of the invention shall become apparent upon the examination of the description that follows in conjunction with the appended illustrations.

Briefly, these and other objects are accomplished within the present invention by providing a generally cylindrical wall anchoring polymeric insert extending at one end as a generally bull-nosed split tip, with the other end forming a transverse annular end face. That annular end face, however, does not include a surrounding flange. Therefore this insert can be inserted to be flush to the wall structure, or wallboard. The installation tool assembly assures the above flush alignment of the insert to the wall surface.

During the insert installation process, this insert will installed in the drilled bore hole. The drilled bore hole and the polymeric anchor insert will be coated with a specified liquid adhesive resin as part of the installation process. The adhesive resin will then encapsulate the insert, and upon cure the insert will be permanently locked into wall.

More precisely, the inventive installation tool assembly includes a screw that is first inserted through a plastic tube spacer segment and then passed through the threaded opening in a generally rectangular, flat, limiting plate. The tool assembly screw is then screwed down until thread lockup occurs between the limiting plate with spacer, and the head of the screw.

To hold the insert for installation, the exposed threaded end of installation tool is placed in the annular face of the insert and the head of the installation screw is spun clockwise to wind on the insert until thread lock-up occurs between the insert face and the flat limiting wall plate.

The required adhesive will be a low viscosity resin which rapidly cures in presence of moisture, and expands during cure cycle. Such an adhesive is available from the Gorilla Glue Company, Cincinnati, Ohio.

Following is an insert installation procedure.
1. Drill hole in wall board using a standard bit
2. Moisten interior of bored hole using a wet cotton swab (Q-Tip™)
3. Fill a small reservoir (1 cc) cup approximately ½ full with specified resin.
4. Using a cotton swab (Q-Tip), rotate the swab in the resin cup to coat the swab. Then rotate the swab slowly into the pre-moistened bore hole to allow resin to transfer to bore surface. Remove cotton swab from bore and again rotate the swab in the cup resin to coat swab end. Holding the screw head end of the insert assembly, rotate the resin cotton swab around the ribbed section of insert.
5. Place the coated insert assembly into the pre-moistened bore hole and with hand pressure press the install tool forward until the wall plate is flush to wall surface.
6. Rotate the screw head of the insert assembly counter clockwise a few turns until the assembly is loose from the insert, and then remove, leaving insert in place.
7. If there is any excess resin on the wall board area, wipe away with paper towel.
8. Allow resin minimum 45 minutes of cure time. Install desired hanger attachment. The installed hanger will be flush to wall.

Note: Various methods for the resin coating and curing are possible.

While the outward appearance of this new installed insert is similar to that of prior-art wall fasteners, the are several significant differences.

The prior art fastener must have a wall flange to allow the insert screw to apply compressive force to draw the split tip wings of insert over the back side of wall board to trap the insert.

Our new insert will be locked into position by the encapsulating adhesive. The split tip of this new insert does not trap the insert. The split tip, along with the ribs and pockets on the insert, all serve to accumulate adhesive during the resin coating. That resin expands and forms a knot of adhesive resin around the ribbed tip section of insert. When that encapsulating resin cures, the insert is locked mechanically onto the backside of the wall board. The resin coating the bore hole also expands and locks onto the cylindrical section of the insert. That bore coating resin also works to repair damage done to the fragile wall board by the hole drilling.

Those skilled in the art will appreciate that the foregoing process assures a flush insertion depth by the contact between the surrounding wall and the limiting plate. As this insert process locks the insert in position, the insert can be used multiple times without coming loose in wall, and at such time as that particular attach location is no longer needed, there is one small nail size hole to spackle and paint.

The exterior of insert can be an expediently coarse surface to enhance the mechanical lock of adhesive resin on the insert.

Following a sufficient curing time period allowing the adhesive to set up, the insert is fully fixed within the wall by the now cured adhesive, inserted at a depth that is flush with the adjacent surfaces, thereby providing a fully engaged liner that includes a properly fitted interior opening in which a hanger mount can be engaged.

Those devoted to decorating will then appreciate that once the usefulness of this wall-mount supporting insert has passed, no inordinate removal and repairing processes need to be engaged. The very limited exposed screw attachment hole is easily filled and the wall integrity is retained.

DESCRIPTION OF THE PREFERRED
EMBODIMENT AND THE METHOD OF THE
USE THEREOF

Figure 1:
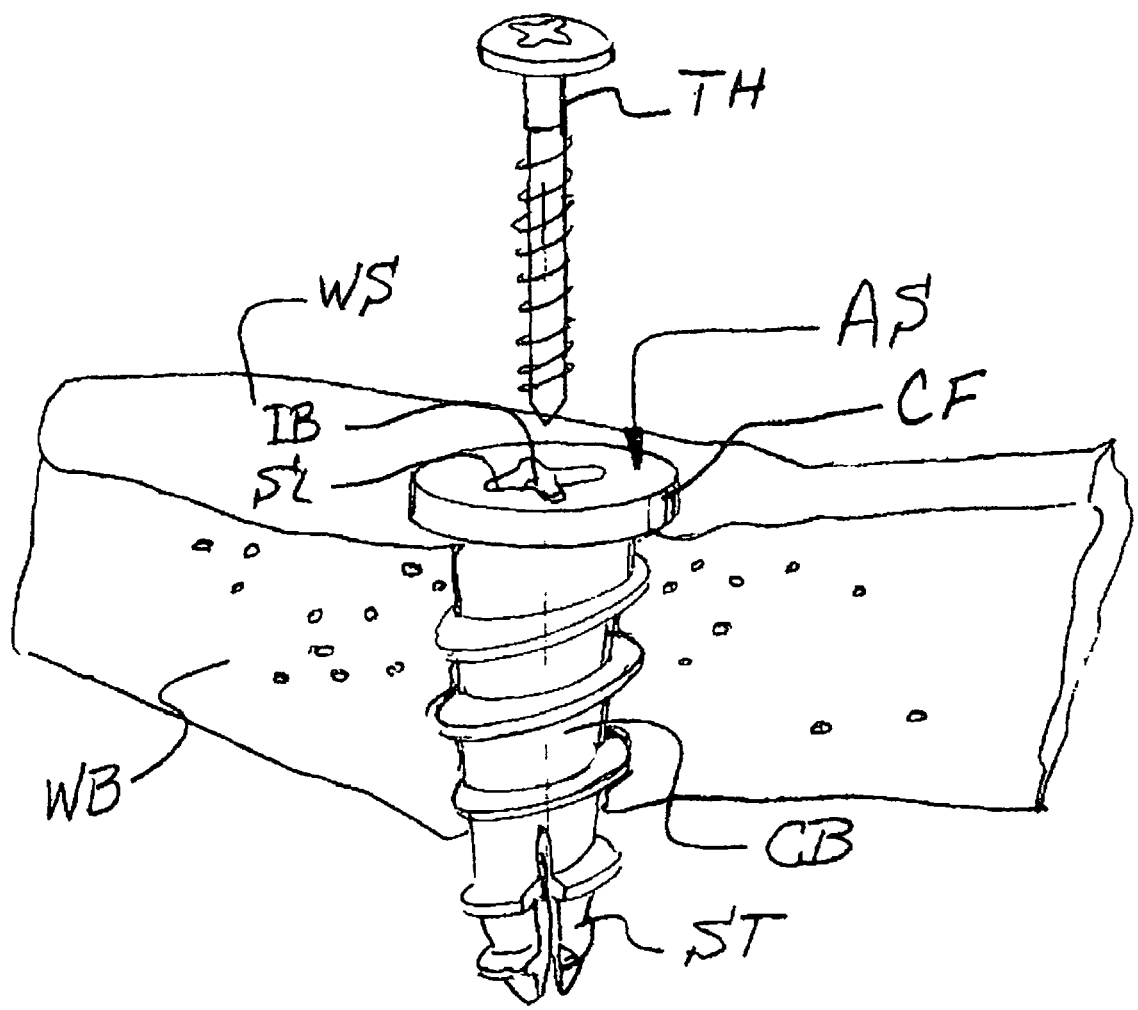
FIG. 1 is a perspective illustration detail, in partial section, of a prior art wall anchor structure.

As shown in FIG. 1, the typical prior art polymeric wall anchor structure AS is defined by a generally conical body CB extending orthogonally from a circular flange CF at its wide end and ending at a pointed free end that is split in the form of a split tip ST. A helical thread HT extends on the conical exterior of body CB to end on the split tip ST so that once the split tip penetrates the exterior surface WS of a wall board WB all further turning advances the conical body fully into the wall board until the circular flange CF abuts the wall surface WS. In this inserted state the anchor structure is then permanently locked into the wall board by the receipt of a threaded hanger TH in an interior bore IB which then spreads the split tip ST to fully engage the assembly in place within the wall board, the same interior bore including dimples or slots SL for any turning tool used.

While this anchoring structure has been quite successful in its application, the protruding thickness of the flange CF persists once its function is no longer needed. At that point the robust interlock of the expanded anchor structure AS with the wall board WB invariably results in some surface damage to the wall surface in the course of its extraction. Thus while quite useful and effective this, and similar, anchoring structures increase the work that needs to be expended in any re-decorating effort.

Figure 2:
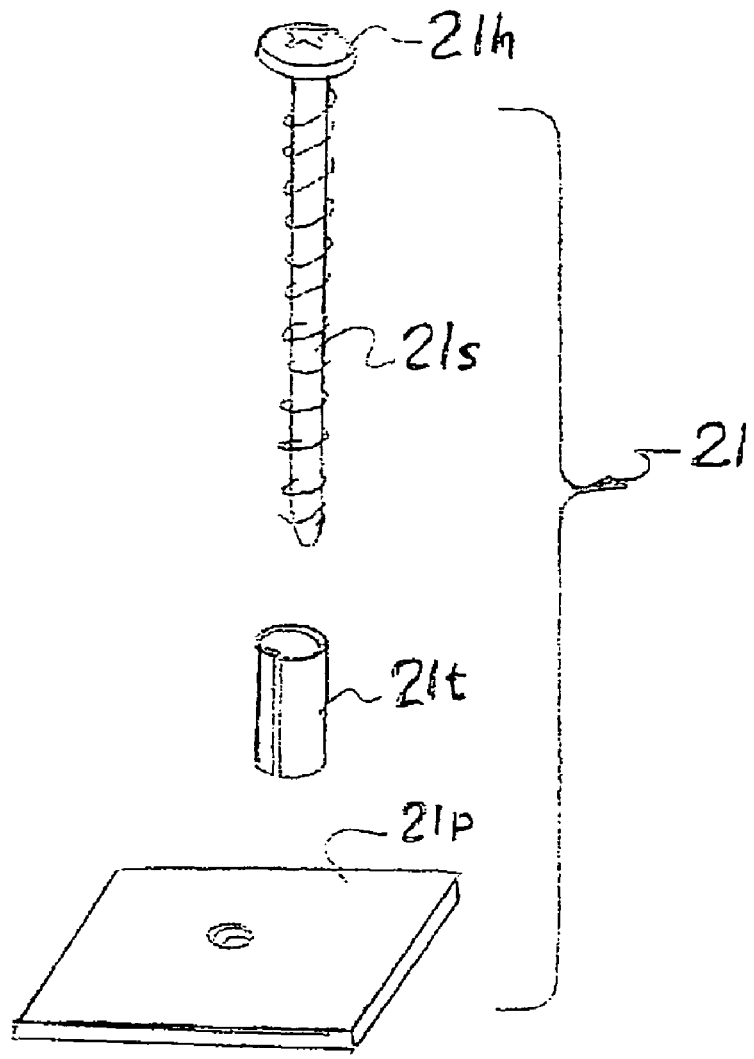
FIG. 2 is a perspective illustration, separated by parts, of the inventive wall anchor installation tool assembly, and inventive wall anchor insert.
Figure 2:
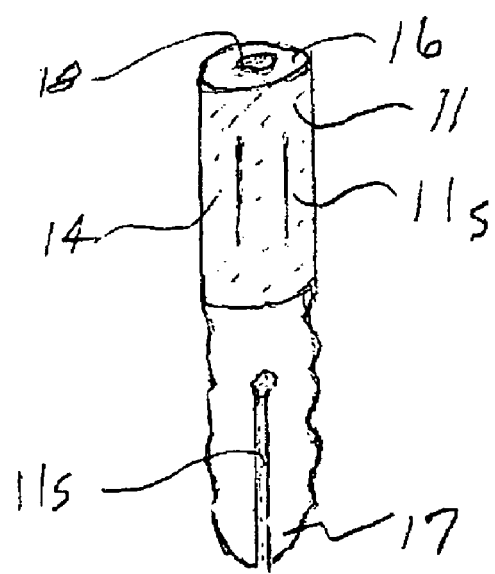
Figure 3:
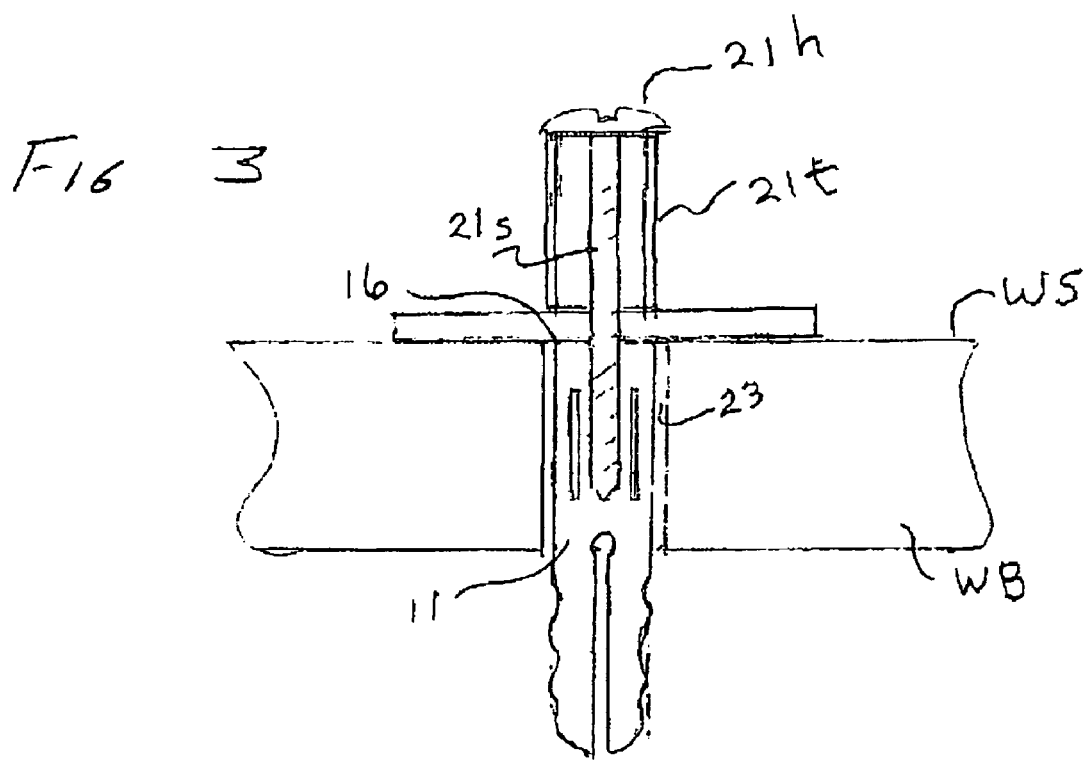
FIG. 3 is a side view detail, in partial section, of the inventive wall anchor inserted by way of the inventive installation tool into a drilled bore hole.
Figure 4:
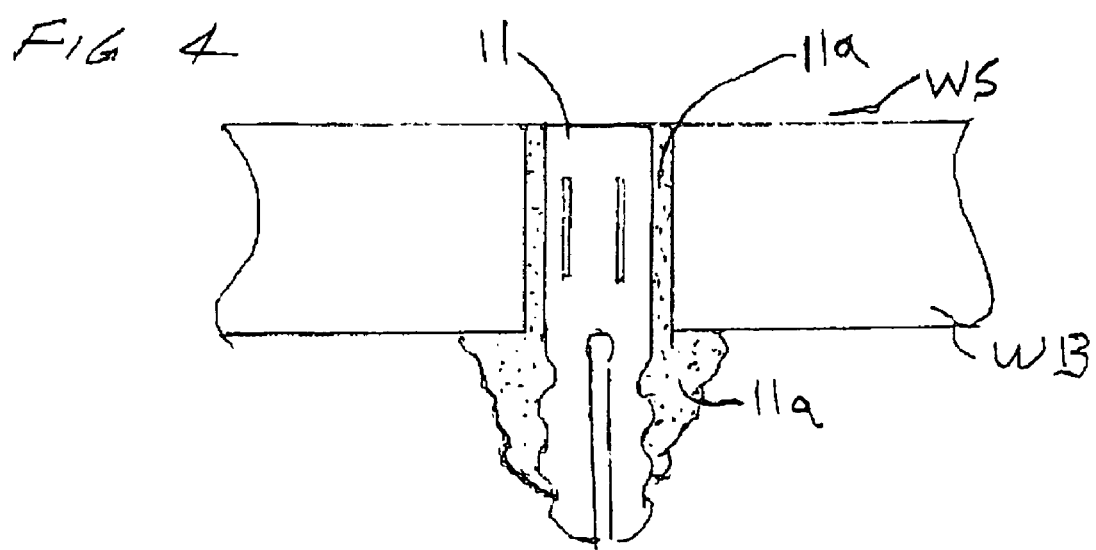
FIG. 4 shows the wall anchor after installation and removal of the installation tool, and depicts the encapsulating resin that collects around the ribbed split tip section of the insert, thereby mechanically locking the insert onto the backside of wall board. Also, it depicts the adhesive resin in the bore area, that as it cures and expands will serve to stabilize the drilled surface of the bored hole and mechanically lock the bore area onto the cylindrical portion of the insert.

To avoid the foregoing tedium and expense of renewing wall surface, I have devised an inventive anchoring structure, together with its installation tooling and the process for the use thereof, which I now describe by reference to FIGS. 2-4 in which a polymeric, generally cylindrical anchoring insert 11 defined by a roughened exterior surface 14 extending between an upper annular face 16 and a generally bull-nosed split tip 17. The anchor insert 11 also has several slits 11s to serve to accumulate the adhesive resin 11a that will expand during cure to mechanically lock in the installed anchor.

Unlike the prior art described above, however, the annular face 16 does not form an insertion limiting flange, but does include an interior opening 18 that extends axially through the length of the anchoring insert and into the split tip 17. It is this axial opening that is then useful to mount a hanger from which décor may be suspended once the anchoring structure is imbedded in the wall board WB. It is also this same axial opening that is utilized by the inventive insertion tool 21 to hold the insert anchor 11 during the resin coating process and then to facilitate the installation of the resin coated anchor into bore hole, aligning the face of the insert flush to wall surface WS.

The initial step for this new wall insert procedure is to drill specified bore hole in the wall board. Then using a moistened cotton swab (Q-Tip™) moisture is transferred to the surface area of the bored hole.

To effect the anchor installation sequence, an inventive installation tool assembly 21 is provided, comprising a screw 21s conformed for threaded advancement into the axial opening 18 having been first passed through a thin-walled polymeric tubular spacer 21t, and then threaded transversely through a flat, generally rectangular, plate 21p until spacer 21t is in compression between screw head 21h and plate 21p. To hold the insert for installation, the exposed threaded end of installation tool 21 is placed in the annular hole 18 in face of insert 16. The head of 21s screw is spun clockwise to wind the insert 11 onto tool until thread lock-up occurs between the insert face and the flat limiting wall plate 21p.

The tool 21 then cleanly holds insert to facilitate resin coating of ribbed end of insert 11, and then enables the insert to be placed into bore hole 23 and with hand pressure pushed down until wall plate 21p abuts wall surface WS, so that the insert face is flush to wall.

As previously mentioned, the bore hole and the ribbed end of the insert are coated with the adhesive resin 11a just prior to the installation. Upon cure, this adhesive resin will provide mechanical lock between the installed insert and the wall. The resin 11a that is coated on the ribbed end of the insert, will form a knot encapsulation on ribbed portion of the insert that will lock the insert to the backside of the wall board. The adhesive resin coating in the bore hole will expand and cure to lock onto the cylindrical section of the insert and also serve to stabilize the wall board area around the drilled bore hole.

It will be appreciated that while the foregoing description refers to a wall board wall structure, the foregoing method and inventive structure are equally useful in the many other modalities of current or past wall construction.

Thus a method and structure that is widely useful is provided that conveniently avoids the onerous requirement entailed in the removal of unused wall anchors to refinish the wall.

Obviously many modifications and variations of the instant invention can be effected without departing from the spirit of It is claimed:

1. An apparatus having a drywall anchor and a tool for inserting the anchor into a drywall; the anchor comprising:
 an insert having a flush end and a tip end configured for insertion into a pre-drilled hole through a drywall wall board until the flush end is substantially flush with an exterior surface of the wall board and the tip end extends in midair beyond the interior of the wall board, the insert having a cylindrical configuration with a central axial bore extending the entire length of the insert; and
 a curable adhesive located in said pre-drilled hole for surrounding said anchor for locking said anchor in said hole upon curing;
 said tool having an elongated screw for threaded engagement with said anchor axial bore for inserting said anchor into said pre-drilled hole.

2. The apparatus recited in claim 1 wherein said tool further comprises a flat plate and a tubular spacer, said elongated screw extending through said spacer and said plate as well as said anchor axial bore for limiting the insertion of said anchor into said pre-drilled hole until said anchor flush end is flush with said wall board exterior surface.

3. An anchor for installation into a pre-drilled hole of a wall surface for anchoring a bolt receiving a hanging structure; the anchor comprising:
 an insert of circular cylindrical shape and having a flangeless flush end and a tip end and a central axial bore extending its entire length; and
 an adhesive for coating the interior surface of said pre-drilled hole and locking said insert into said pre-drilled hole with its tip end extending in midair beyond the interior of the wall board.

4. The anchor recited in claim 3 further comprising an installation tool having an elongated screw for threaded engagement with said axial bore for extending the tip end of said insert into said pre-drilled hole until said flush end is substantially in the same plane as said wall surface.

5. The anchor recited in claim 4 wherein said tool further comprises a flat plate and a tubular spacer, said elongated screw extending through said spacer and said plate as well as said anchor axial bore for limiting the insertion of said anchor into said pre-drilled hole until said anchor flush end is flush with said wall surface.

\* \* \* \* \*